United States Patent
Tsai

(10) Patent No.: US 6,786,131 B2
(45) Date of Patent: Sep. 7, 2004

(54) VALVE USED FOR AN INFLATABLE ARTICLE

(76) Inventor: Lung-Po Tsai, 2F, No. 29-3, Sec. 2, Chung-Cheng E. Rd.,Tan-Shui Chen, Taipei Hsien (TW)

( * ) Notice: Subject to any disclaimer, the term of this patent is extended or adjusted under 35 U.S.C. 154(b) by 88 days.

(21) Appl. No.: 10/227,855

(22) Filed: Aug. 27, 2002

(65) Prior Publication Data

US 2004/0040596 A1 Mar. 4, 2004

(51) Int. Cl.$^7$ .............................. F15B 13/04; F16L 37/38
(52) U.S. Cl. ........................... 91/432; 285/361; 215/392
(58) Field of Search .......................... 91/432; 285/361; 215/392

(56) References Cited

U.S. PATENT DOCUMENTS

| | | | | |
|---|---|---|---|---|
| 562,414 A | * | 8/1896 | O'Leary | 251/149.5 |
| 968,711 A | * | 8/1910 | Stevenson | 251/339 |
| 2,864,628 A | * | 12/1958 | Edleson | 137/614.04 |
| 2,896,977 A | * | 7/1959 | Hansen | 285/277 |
| 3,831,802 A | * | 8/1974 | Chambers et al. | 137/382 |
| 4,366,816 A | * | 1/1983 | Bayard et al. | 137/614.05 |
| 4,510,969 A | * | 4/1985 | Rodth | 137/614.05 |
| 5,009,252 A | * | 4/1991 | Faughn | 137/614.04 |
| 5,168,897 A | * | 12/1992 | Vanderjagt | 137/614.02 |
| 6,578,573 B2 | * | 6/2003 | Koch | 604/110 |

* cited by examiner

*Primary Examiner*—Edward K. Look
*Assistant Examiner*—Igor Kershteyn
(74) *Attorney, Agent, or Firm*—Rosenberg, Klein & Lee

(57) ABSTRACT

A valve used for an inflatable article includes a valve body and a male connector. The valve body has a rear hollow portion, a female connector attached to the rear hollow portion, and a spring-loaded valve core movable therein. The male connector has a first tubular end and a second tubular end, and the second tubular end is dimensioned to be snugly plugged in the female connector to move the spring-loaded valve core backward. Furthermore, the female connector of the valve body defines a pair of L-shaped slots, while the male connector is formed with a pair of bayonet fittings adapted to be held in the L-shaped slots after the second tubular end is plugged, thereby allowing the male connector to be fastened to the female connector and hence to the valve body in a quick-detachable manner.

16 Claims, 8 Drawing Sheets

VALVE USED FOR AN INFLATABLE ARTICLE

BACKGROUND OF THE INVENTION

1. Field of the Invention

The present invention relates to a valve used for an inflatable article and, more particularly, to such a valve in which a male connector can be connected to a valve body in a quick-detachable manner when the inflatable article is required to be inflated.

2. Description of Related Art

It is well known that valves are widely used in inflatable articles, such as air mattresses, quilt bag or the like. It is usually found that these valves can not be quickly connected to pumps when the inflatable articles are necessary to be inflated, particularly in case of emergency.

Therefore, it is an objective of the invention to provide a valve to mitigate and/or obviate the aforementioned problem.

SUMMARY OF THE INVENTION

The object of the present invention is to provide a valve in which a male connector can be connected to a valve body in a quick-detachable manner when an inflatable article provided with the valve is required to be inflated.

Other objects, advantages and novel features of the invention will become more apparent from the following detailed description when taken in conjunction with the accompanying drawings.

DETAILED DESCRIPTION OF THE PREFERRED EMBODIMENT

Figure 1:
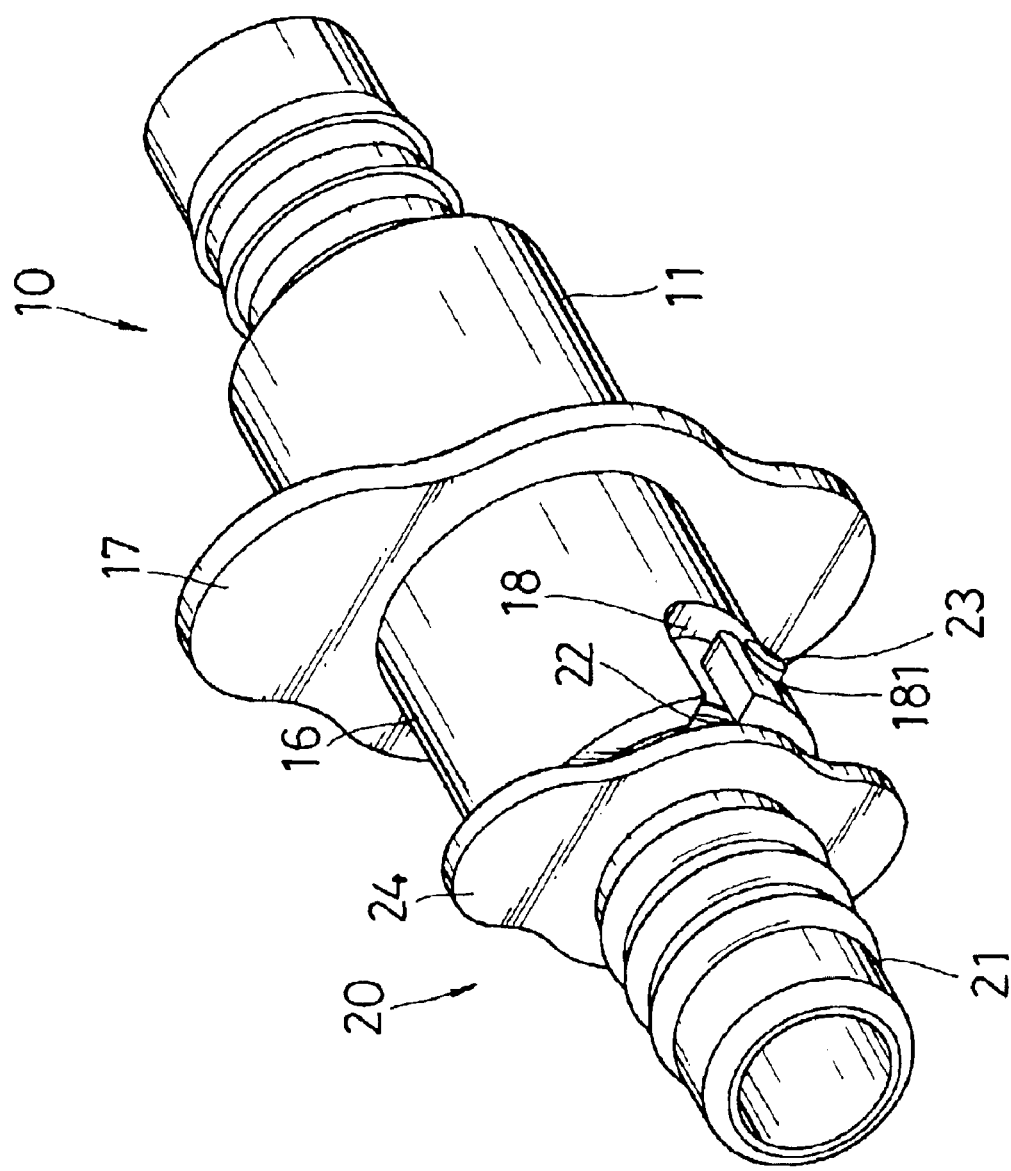
FIG. 1 is a perspective view of a preferred embodiment of a valve in accordance with the present invention used for an inflatable article.
Figure 2:
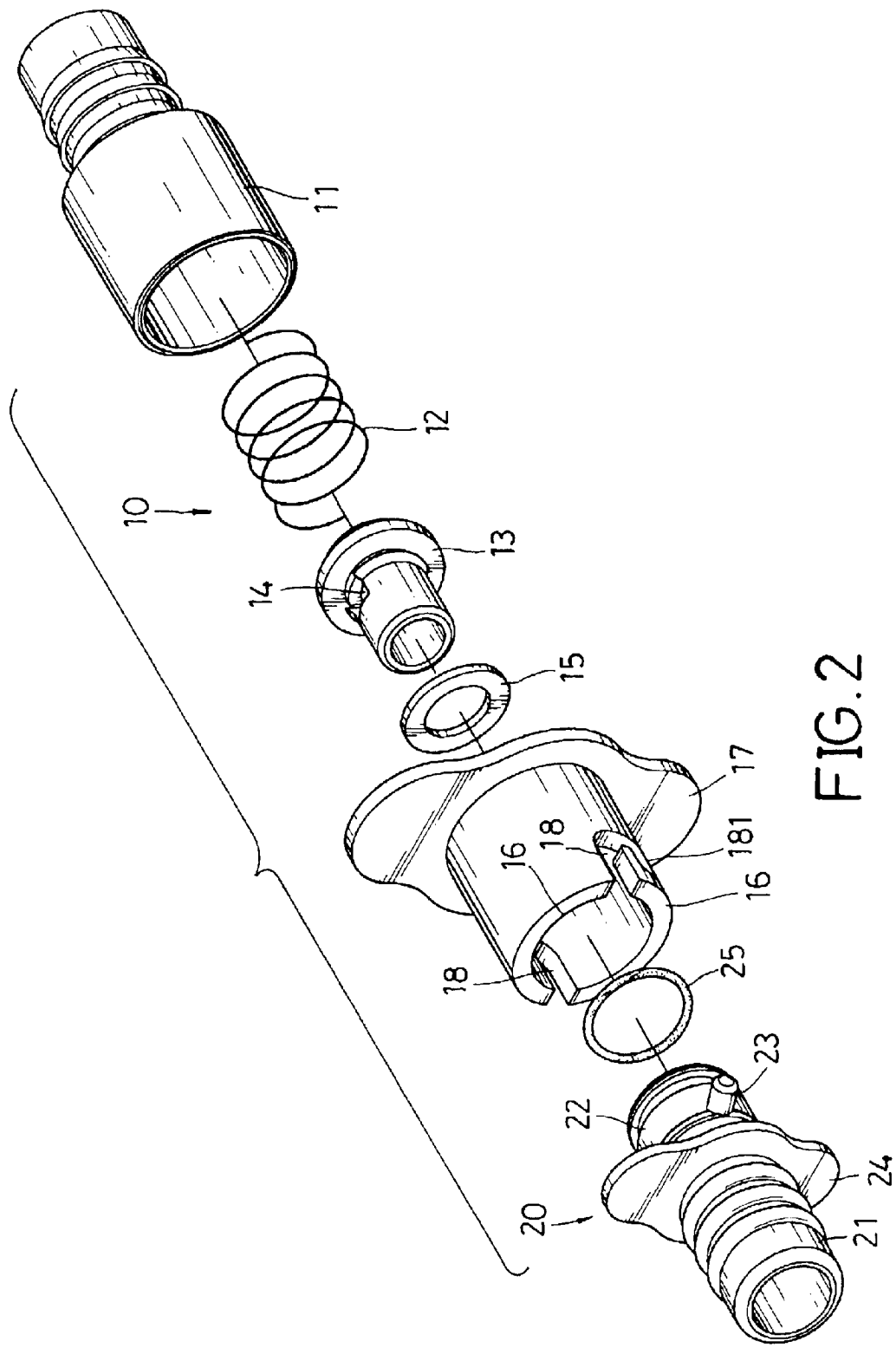
FIG. 2 is an exploded perspective view of the valve of FIG. 1.
Figure 4:
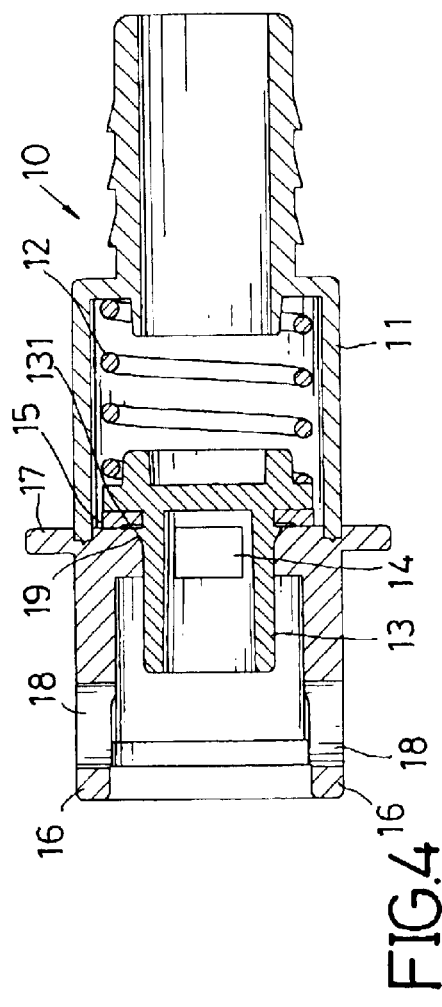
FIG. 4 is a cross-sectional view showing the interior of a valve body included in the inventive valve of FIG. 1.

Referring to FIGS. 1 and 2, there is shown a preferred embodiment of a valve in accordance with the present invention used for an inflatable article, such as an air mattress or a ball. The valve includes a valve body (10) having a rear hollow portion (11) that is formed with a female connector (16) attached thereto, as best shown in FIG. 4. The female connector (16), preferably provided with a flap (17), defines a pair of L-shaped slots (18) having respective hooked slot portions (181).

The inventive valve further includes a male connector (20) that has a threaded first tubular end (21) and a second tubular end (22) both extending from a stop (24) in opposite directions. The second tubular end (22) is dimensioned to be snugly plugged in the female connector (16) and is formed with a O-ring (25) mounted therearound.

Importantly, the male connector (20, 50) is formed with a pair of bayonet fittings (23) adapted to be held in the hooked slot portions (181) of the L-shaped slots (18) immediate after the second tubular end (22) has been plugged, thereby allowing the male connector (20) to be fastened to the female connector (16) and hence to the valve body (10) in a quick-detachable manner.

Figure 3:
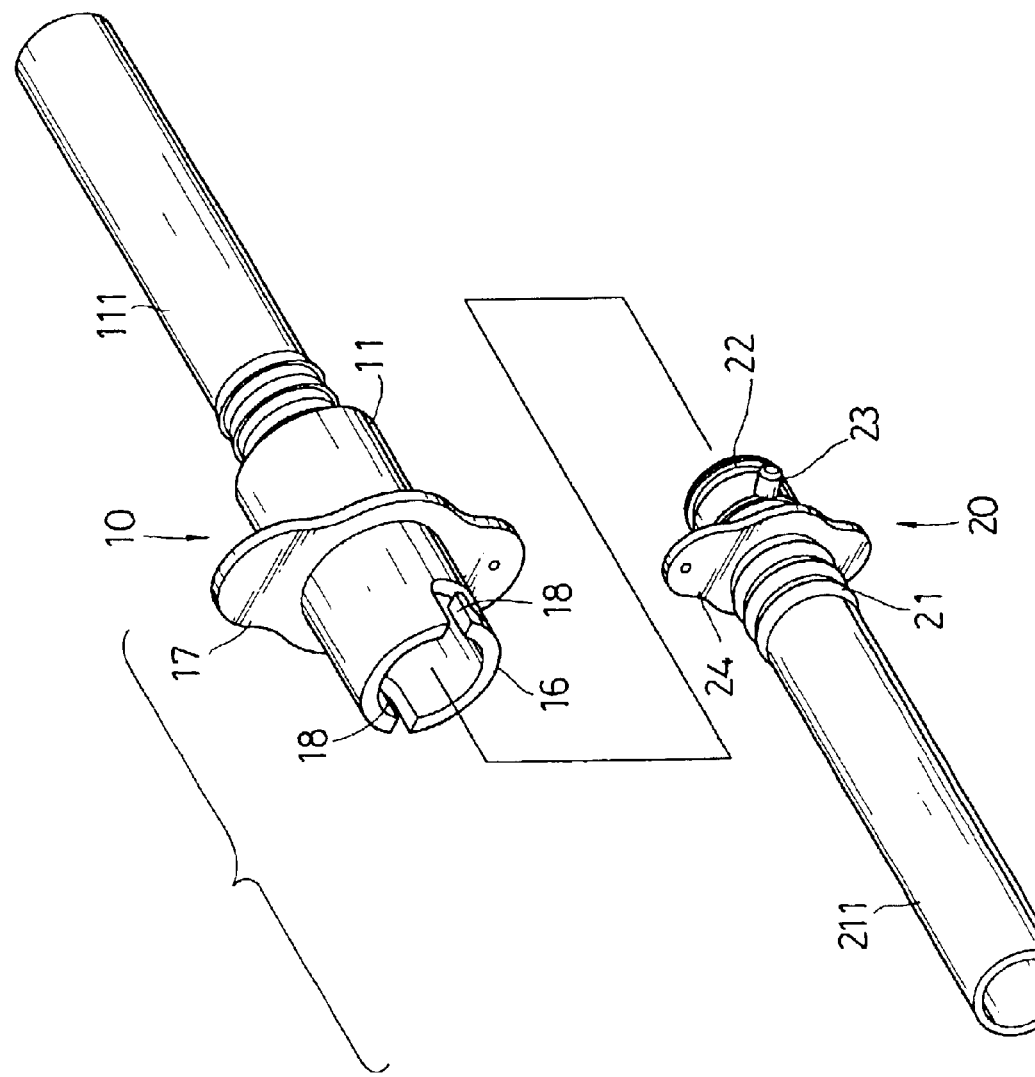
FIG. 3 is a perspective view showing a pair of extension tubes connected to the inventive valve of FIG. 1.

Referring to FIG. 3, if necessary, a first extension tube (111) may be threadedly engagable with the rear hollow portion (11) to connect the valve body (10) to the inflatable article, and/or a second extension tube (211) may be threadedly engagable with the threaded first tubular end (21) to connect the male connector (20) to a pump (not shown), which supplies pressurized air to the article.

Referring to FIG. 4, now the interior of the inventive valve is to be described. The valve body (10) is provided with a spring-loaded valve core (13) movable therein. The valve core (13) has an air port (14) defined therein and a gasket (15) mounted therearound. The gasket (15) is preferably held around the valve core (13) by means of an annular retainer (131), as best shown in FIG. 5, that is normally received in a chamfer (19) defined in an inner partition wall (not numbered) of the female connector (16).

Furthermore, the valve core (13) is spring-loaded, such as by a compressed spring (12), in such a way that a flange (not numbered) of the core (13) is normally pressed against the inner partition wall with the gasket (15) intervening therebetween, in order to prevent compressed air in the inflatable article from escaping through the valve body (10).

Figure 5:
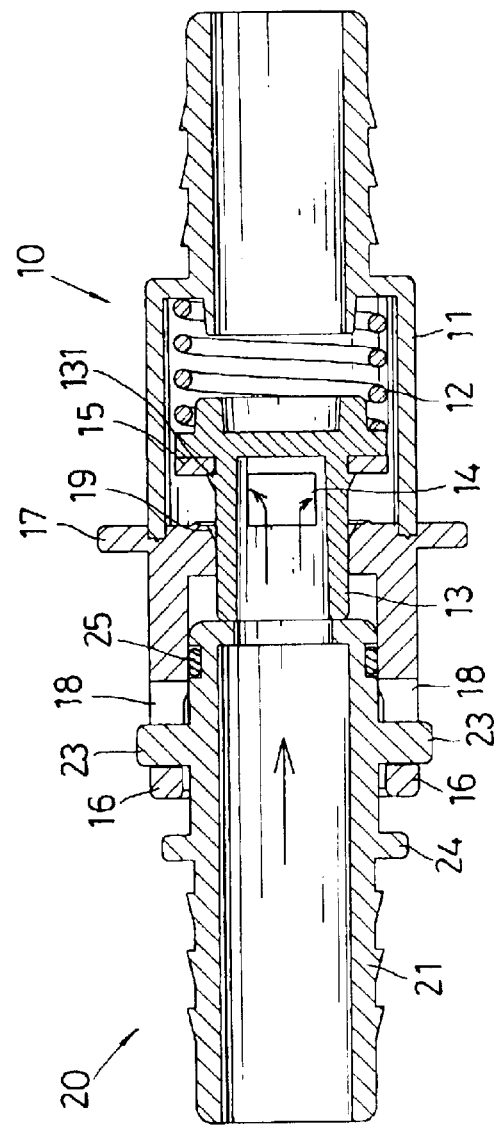
FIG. 5 is a cross-sectional view of the inventive valve of FIG. 1

Referring to FIG. 5, the valve core (13) is moved backward, i.e. rightward as viewed in FIG. 5, once the second tubular end (22) of the male connector (20) is plugged in the female connector (16) and is turned so that the bayonet fittings (23) are held in the hooked slot portions (181) of the L-shaped slots (18). At this time, the inventive valve creates an inner air passage, through which pressurized air can be supplied from an pump to the inflatable article, via the air port (14) in the rearward moved core (13).

As soon as the male connector (20) is removed from the valve body (10), the valve core (13) will be moved back to its original position by the action of the compressed spring (12), and so the air passage in the valve body (10) is blocked. This prevents the compressed are in the inflatable article from escaping through the valve body (10), as mentioned above.

Figure 6:
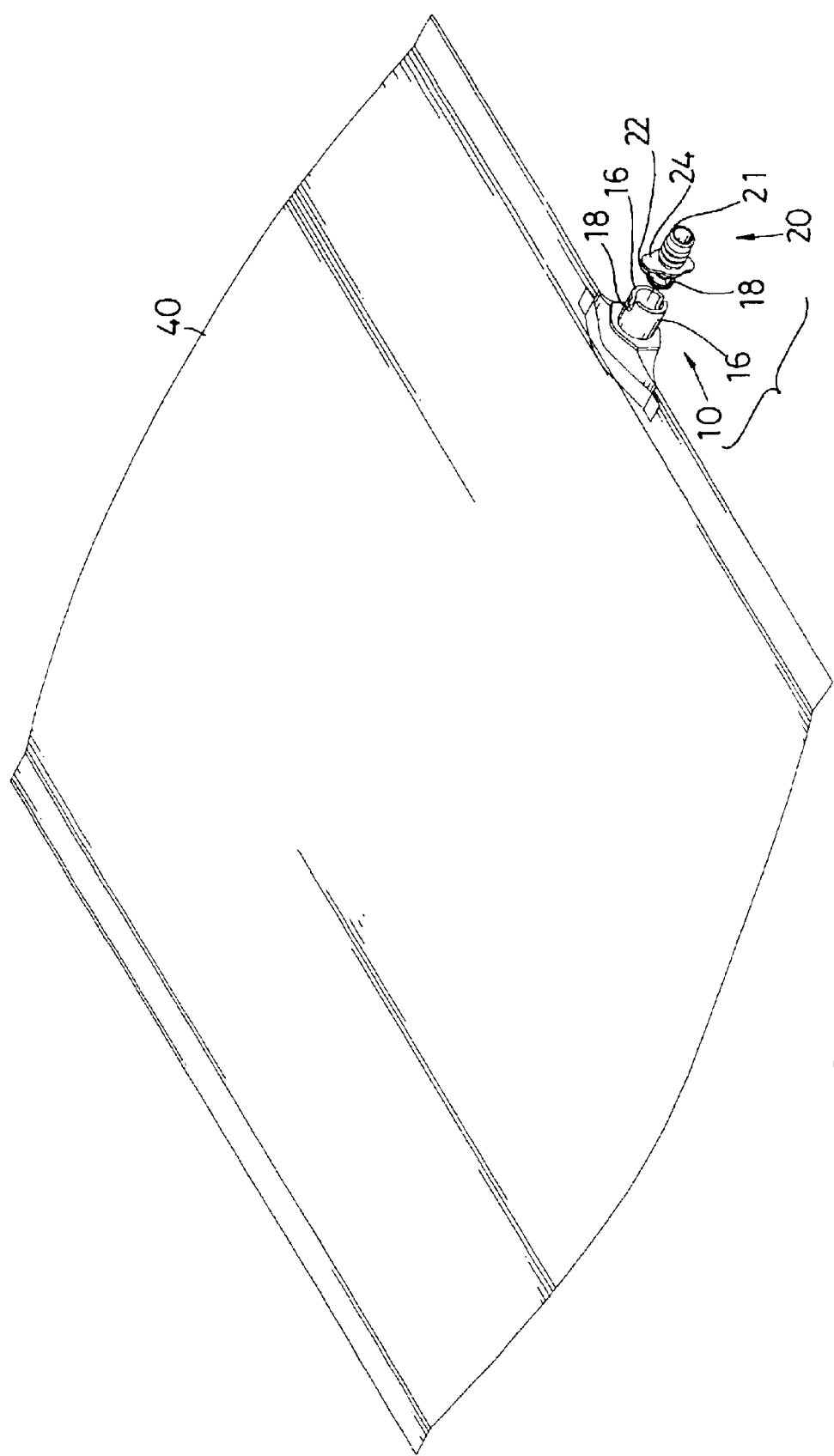
FIG. 6 is a perspective view showing a quilt bag equipped with the inventive valve of FIG. 1.
Figure 7:
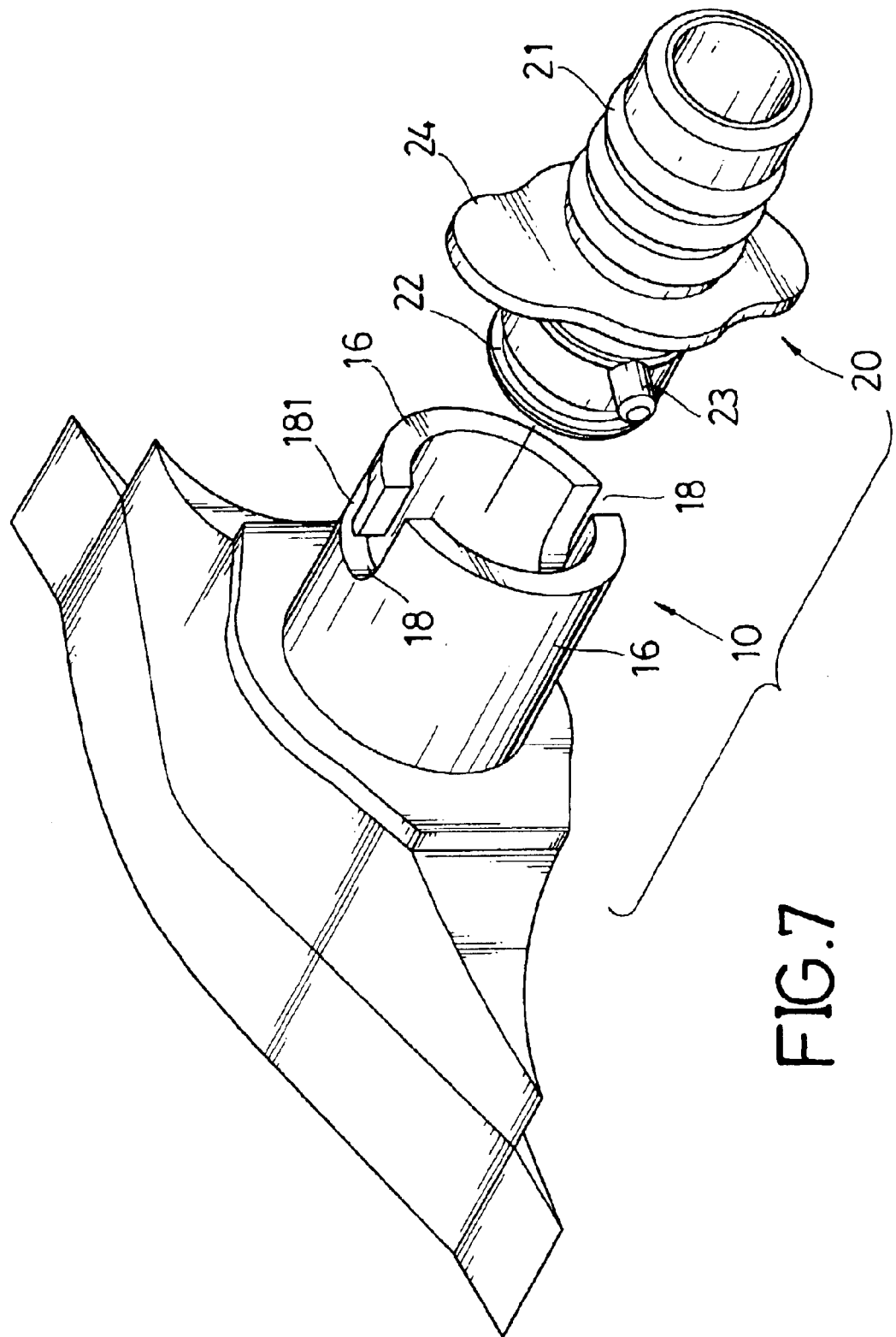
FIG. 7 is an enlarged perspective view of the inventive valve used for the quilt bag of FIG. 6.

Referring to FIGS. 6 and 7, the valve may also be applicable to a bag (40) in which a quilt (not shown) is sealed. After the quick connection of the male connector (20) to the valve body (10), air in the bag (40) as well as in the quilt can be extracted through the inventive valve with an air extractor. As a result, the quilt becomes smaller for easy storage.

Figure 8:
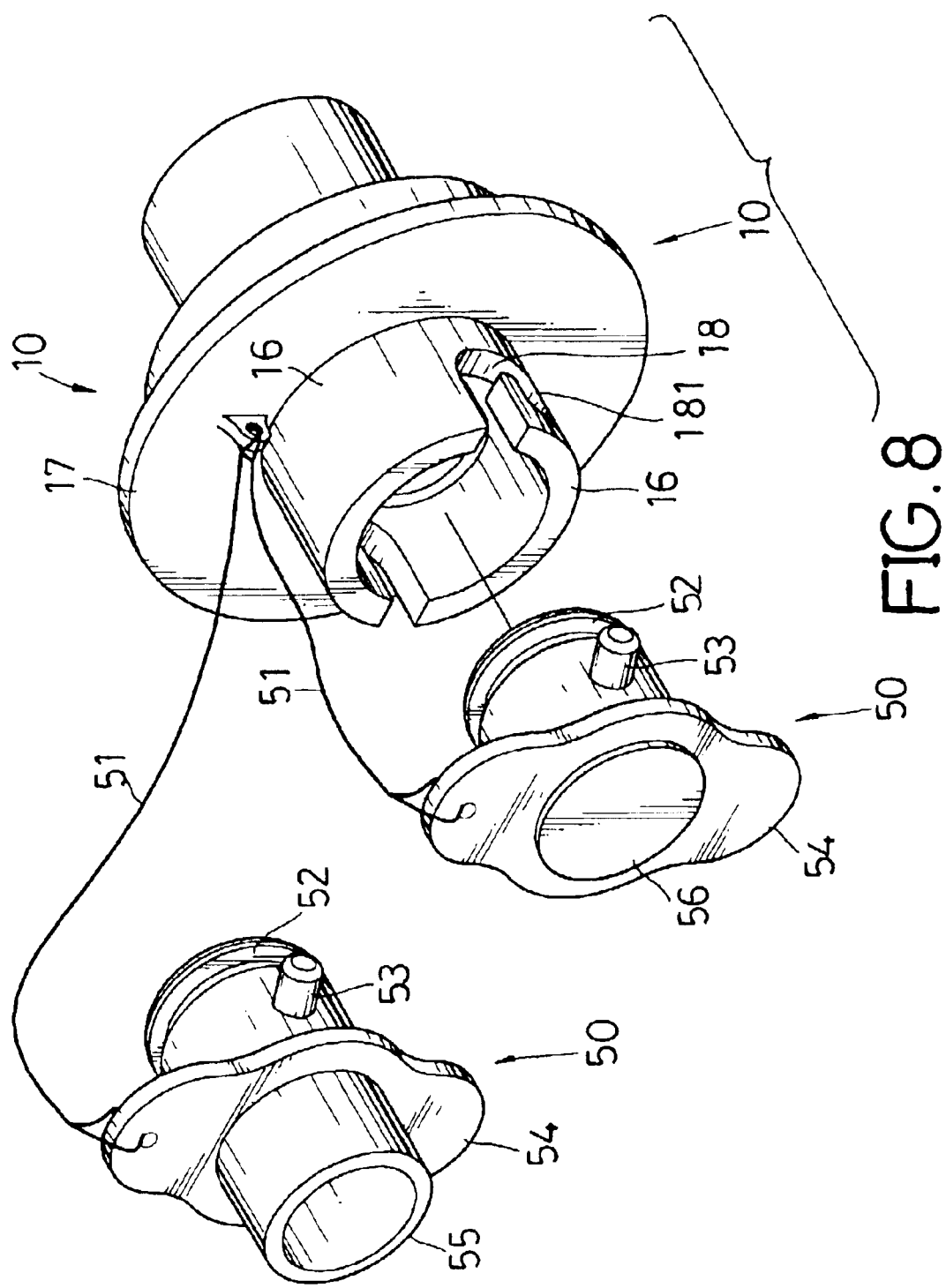
FIG. 8 is an exploded perspective view of an alternative embodiment of the inventive valve.

Referring to FIG. 8, there is shown an alternative embodiment of the inventive valve. This valve also includes the valve body (10), as well as a male connector (50) which is similar to the aforementioned one in the previous embodiment.

In detail, the male connector (50) here has a first tubular end (55) and a second tubular end (52) both extending from a first stop (54) in opposite directions, with a pair of bayonet fittings (53) extending from the male connector (50) so as to be held in the hooked slot portions (181) of the L-shaped slots (18) of the valve body (10) after the second tubular end (52) has been plugged in the female connector (16) of the same body (10).

In this embodiment, however, there is further provided a cap (50') for covering the female connector (16) of the valve body (10). As clearly shown, the cap (50') has a closed end (56'), a cylindrical end (52') extending from a second stop (54'), and a pair of bayonet fittings (53') adapted to be held in the L-shaped slots (18) after the cylindrical end (52') has been plugged. It is to be noted that the cylindrical end (52') is dimensioned to be snugly plugged in the female connector (16) without moving the spring-loaded valve core (13) of the valve body (10) backward.

Both the cap (50') and male connector (50) are preferably tied to the valve body (10) with respective cords (51', 51), which avoid the loss of the cap (50') and connector (50).

Figure 9:
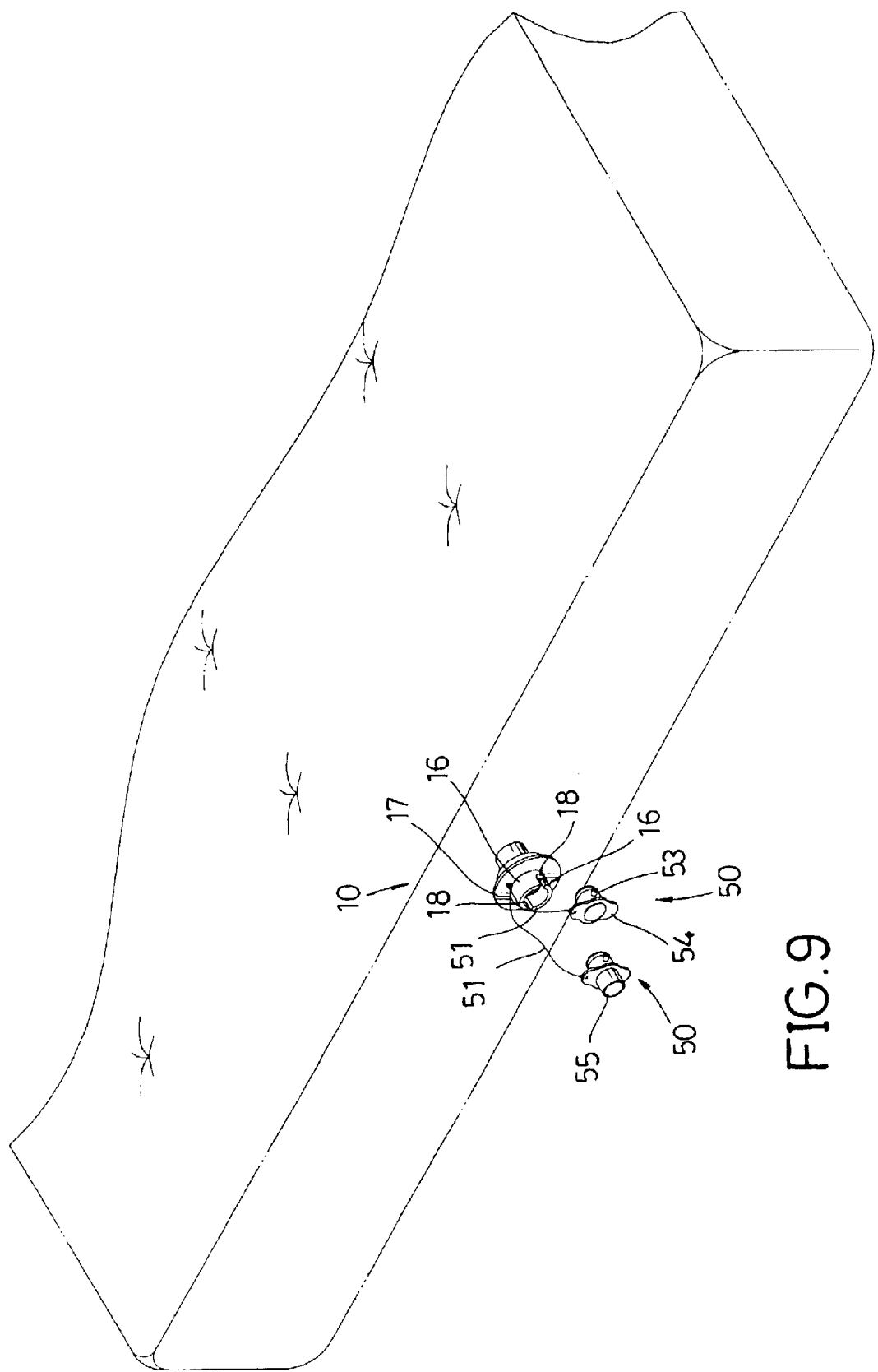
FIG. 9 is a perspective view showing an air mattress equipped with the valve of FIG. 8.

Referring to FIG. 9, an air mattress provided with the inventive valve of FIG. 8 is shown. The air mattress can be inflated by connecting the male connector (50) to the female connector (16) of the valve body (10). After the inflation, it is the cap (50') that is connected to the female connector (16) to prevent compressed are in the air mattress from escaping through the valve body (10).

From the above description, it is apparent that the invention has the advantage that the male connector (20, 50) can be connected to the valve body (10) in a quick-detachable manner whenever the inflatable article provided with the inventive valve is required to be inflated.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A valve used for an inflatable article, comprising:
   a valve body (10) having a rear hollow portion (11) and a female connector (16) attached to said rear hollow portion (11), said valve body (10) being provided with a spring-loaded valve core (13) movable therein;
   a male connector (20, 50) having a first tubular end (21, 55) and a second tubular end (22, 52), said second tubular end (22, 52) being dimensioned to be snugly plugged in said female connector (16) to move said spring-loaded valve core (13) backward;
   a cap (50') for covering said female connector (16) of said valve body (10), wherein said cap (50') has a closed end (56'), and a cylindrical end (52') dimensioned to be snugly plugged in said female connector (16) without moving said spring-loaded valve core (13) backward, and wherein said cap (50') is formed with a pair of bayonet fittings (53') adapted to be held in said L-shaped slots (18) after said cylindrical end (52') has been plugged; and
   wherein said female connector (16) of said valve body (10) defines a pair of L-shaped slots (18), while said male connector (20, 50) is formed with a pair of bayonet fittings (23, 53) adapted to be held in said L-shaped slots (18) after said second tubular end (22, 52) is plugged, thereby allowing said male connector (20, 50) to be fastened to said female connector (16) and hence to said valve body (10) in a quick-detachable manner.

2. The valve as claimed in claim 1, wherein said valve core (13) has a gasket (15) mounted therearound.

3. The valve as claimed in claim 2, wherein said valve core (13) has an annular retainer (131) for holding said gasket (15) therearound, and wherein said female connector (16) has a chamfer (19) for receiving said annular retainer (131) of said valve core (13).

4. The valve as claimed in claim 3, wherein said male connector (20, 50) is formed with an O-ring (25) mounted around said second tubular end (22, 52).

5. The valve as claimed in claim 4, wherein said first tubular end (21) of said male connector (20) is configured as a threaded end (21).

6. The valve as claimed in claim 3, wherein said first tubular end (21) of said male connector (20) is configured as a threaded end (21).

7. The valve as claimed in claim 2, wherein said male connector (20, 50) is formed with an O-ring (25) mounted around said second tubular end (22, 52).

8. The valve as claimed in claim 7, wherein said first tubular end (21) of said male connector (20) is configured as a threaded end (21).

9. The valve as claimed in claim 2, wherein said first tubular end (21) of said male connector (20) is configured as a threaded end (21).

10. The valve as claimed in claim 1, wherein said male connector (20, 50) is formed with a O-ring (25) mounted around said second tubular end (22, 52).

11. The valve as claimed in claim 1, wherein said first tubular end (21) of said male connector (20) is configured as a threaded end (21).

12. The valve as claimed in claim 11 further including a first extension tube (111) threadedly engagable with said rear hollow portion (11) of said valve body (10) and a second extension tube (211) threadedly engagable with said first tubular end (21) of said male connector (20).

13. The valve as claimed in claim 1 further including a first cord (51') to tie said cap (50') to said valve body (10).

14. The valve as claimed in claim 13 further including a second cord (51) to tie said male connector (50) to said valve body (10).

15. The valve as claimed in claim 13, wherein said first tubular end (21) of said male connector (20) is configured as a threaded end (21).

16. The valve as claimed in claim 14, wherein said first tubular end (21) of said male connector (20) is configured as a threaded end (21).

* * * * *